Figure 1:
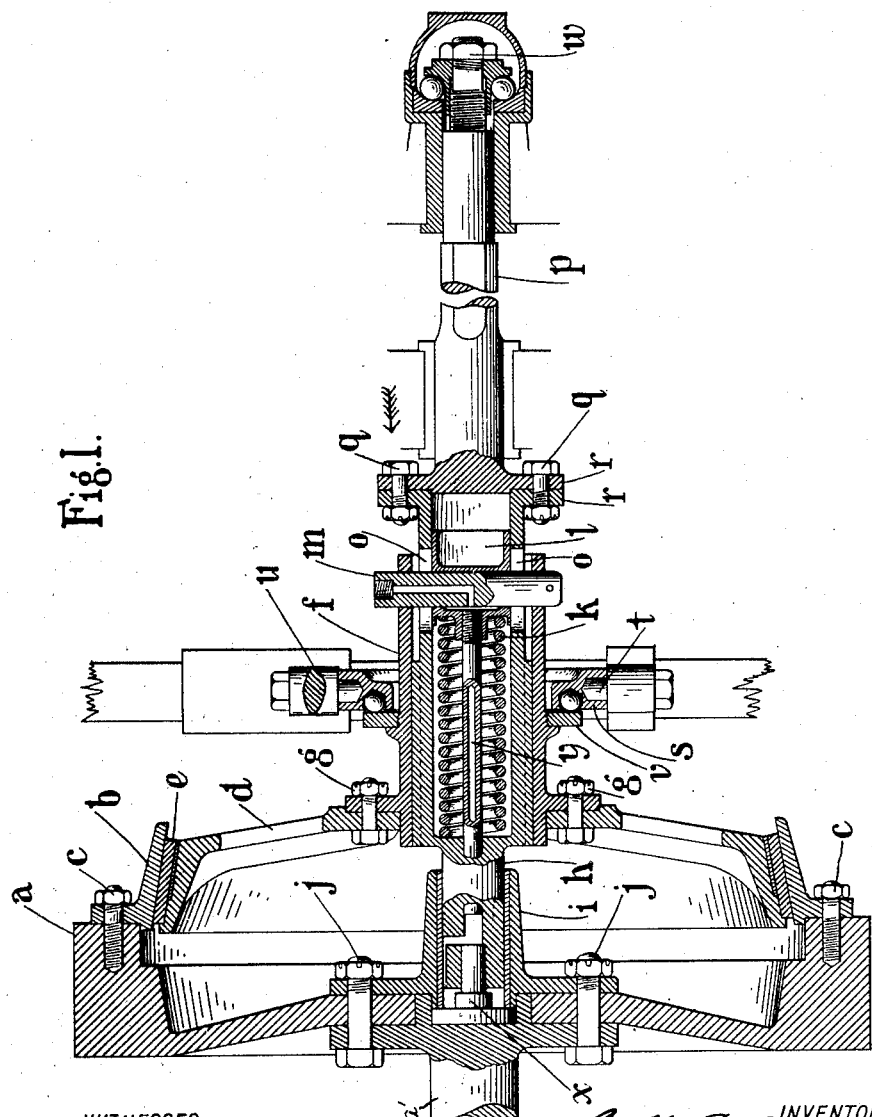

No. 883,552. PATENTED MAR. 31, 1908.
C. R. MABLEY & G. E. FRANQUIST.
CLUTCH MECHANISM.
APPLICATION FILED JAN. 9, 1904.

2 SHEETS—SHEET 1.

WITNESSES:

INVENTORS

BY

ATTORNEYS.

No. 883,552. PATENTED MAR. 31, 1908.
C. R. MABLEY & G. E. FRANQUIST.
CLUTCH MECHANISM.
APPLICATION FILED JAN. 9, 1904.
2 SHEETS—SHEET 2.
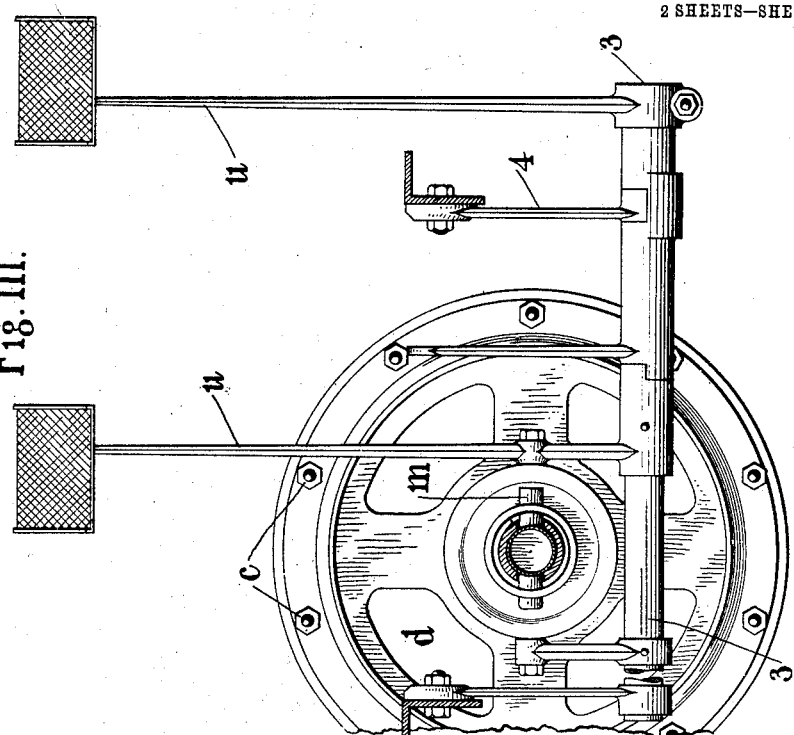
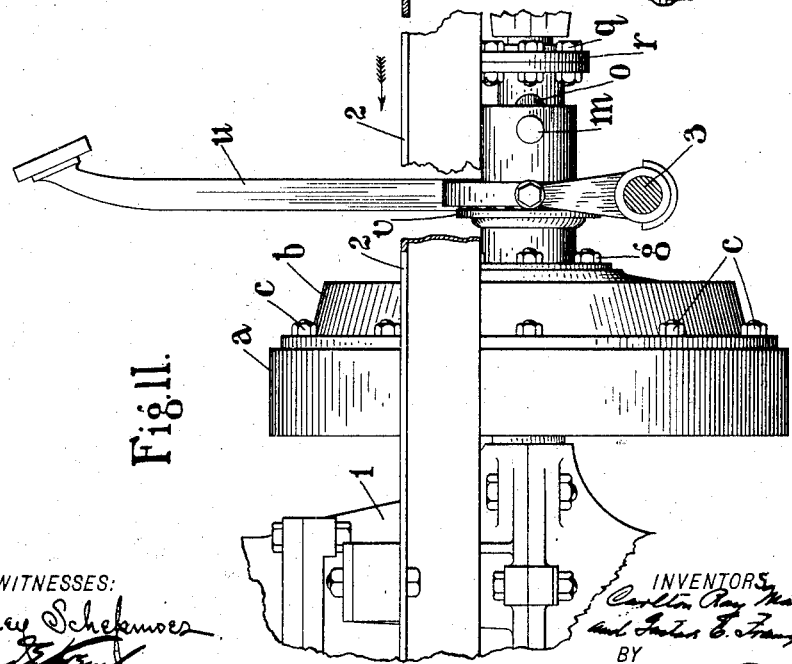
WITNESSES:
INVENTORS
BY
ATTORNEYS

UNITED STATES PATENT OFFICE.

CARLTON R. MABLEY AND GUSTAVE E. FRANQUIST, OF NEW YORK, N. Y., ASSIGNORS, BY MESNE ASSIGNMENTS, TO CONTINENTAL AUTOMOBILE COMPANY, A CORPORATION OF NEW YORK.

CLUTCH MECHANISM.

No. 883,552.  Specification of Letters Patent.  Patented March 31, 1908.

Application filed January 9, 1904. Serial No. 188,327.

*To all whom it may concern:*

Be it known that we, CARLTON RAY MABLEY and GUSTAVE E. FRANQUIST, citizens of the United States, and both residing in the borough of Manhattan, city, county, and State of New York, have invented certain new and useful Improvements in Clutch Mechanism, of which the following is a specification.

This invention relates to clutch mechanism, more particularly to clutches used for the transmission of power from an engine, and embodies a construction by which the clutch parts can be removed without necessitating disarrangement of other parts of the mechanism.

The invention is more especially designed for use on automobiles or self-propelled vehicles of any character. At the present time it is extremely difficult to renew the parts of the clutch for the reason that the necessities of construction of automobiles is such that the space in which the parts are contained is very limited, and in order to get at the clutch, numerous parts must be removed, causing trouble when the machine is put together again, owing to the difficulty of alining the various parts. In addition, it is quite inconvenient to take the machine apart whenever an accident happens to the clutch. Clutches made in accordance with this invention can readily be removed and put in place without the necessity of taking out the main shaft of the machine.

In the accompanying drawing is shown a construction in which our invention is embodied.

In this drawing, Figure 1 is a longitudinal section of a clutch and mountings showing one form of our invention; Fig. 2 is a broken away side elevation of the parts showing the same in place on an automobile; and Fig. 3 is an end view looking in the direction of the arrow in Fig. 1.

In the drawing $a$ indicates the fly-wheel of the engine mounted on shaft $a'$; $b$ is a friction ring secured to the outside of the fly-wheel $a$ by suitable bolts $c$.

$d$ is the movable member which rests within and bears upon the friction ring $b$, a facing $e$ intervening between the two parts. It is intended to make the clutch $d$ of aluminium for the purposes of lightness. The clutch $d$ is carried by a longitudinally movable cylindrical sleeve $f$, to which it is fastened by bolts $g$. This sleeve $f$ is mounted on a hollow intermediate shaft $h$ in alinement with shaft $a'$. This shaft $h$ rests in a bearing $i$ secured to the flywheel by the bolts $j$. The hollow shaft $h$ is capable of revolving in the bearing $i$. Inclosed in the hollow shaft $h$ is a spring $k$ which bears against a sliding sleeve $l$ into which latter $l$ a pin $m$ is fitted, which pin passes through slots $o$ in the shaft $h$ into sleeve $f$, so that the expansion of spring $k$ on the pin $m$ tends to move the sleeve $f$ and the said shaft $h$ in opposite directions longitudinally to clutch the flywheel and the driven shaft $p$. The shaft $h$ is bolted to shaft $p$ by bolts $q$ passing through couplings $r$ on both shafts. The sleeve $f$ is surrounded by a ball race $s$ having suitable trunnions $t$ for the operating lever $u$, the balls running on the bearing plate $v$. At the end of the shaft $p$ is a thrust bearing $w$; this thrust bearing $w$ is intended to resist any longitudinal movements of the shafts $p$ and $h$ toward the flywheel. Another thrust bearing $x$ is provided for the purpose of neutralizing the strain of the spring $k$, which, pulling upon the clutch, tends to draw the flywheel toward the clutch and cause a pulling strain on the engine bearings. This thrust bearing balances the power of the spring.

In ordinary constructions, great difficulty is experienced in removing the clutch to repair its bearing, and by this invention, such difficulties are overcome, and the removal of the clutch facilitated. In order to remove the clutch, it is only necessary to remove the bolts $c$, $j$ and $q$ which hold the friction ring $b$, clutch $d$ and the bearing $i$ so that the shaft $h$ and the parts carried thereby can be lifted out without disturbing the engine bearings or the driven shaft $p$.

It is obvious that if the bolts holding the friction ring $b$ are loosened, the spring will force the sleeve $f$ and clutch $d$ back as far as the slot in the hollow shaft $h$ will permit. The bolts which hold the bearing $i$ are easily reached through apertures in the movable member $d$. The thrust bearing $x$ and the bearing $i$ are lubricated by means of a tube $y$ coincident with the axis of the hollow shaft $h$. This tube $y$ is secured in place by seating the same in the sliding piece $l$. An oil hole is drilled in the key $m$ to meet the hole in the tube $y$.

In Figs. 2 and 3, we have shown the mode of mounting the parts to the frame of an automobile. In this, 1 indicates the engine, 2 the main frame of the machine, 3 the rock shaft for the operating levers $u$,—the said rock shaft being suitably suspended from the main frame of the machine by brackets 4 in the usual manner. After making the necessary repairs to the clutch, it may be replaced in the machine, and thus it will be seen that it is unnecessary to take the machine apart or to take the transmission or driven shaft out of the machine.

For the purposes of this application, we shall regard the shaft $a'$ as the driving shaft, and the shaft $p$ as the driven shaft. It will be understood, however, that our improvement may be applied in any situation where it is undesirable to remove the driving or driven shaft from the machine, but wherein it may be desirable to use a construction wherein the parts shall all be accessible for inspection or removal.

It will be seen that the arrangement of the detachable driving clutch member on the flywheel, together with the detachable thrust bearing on the end of the intermediate shaft enables the entire clutch mechanism to be removed without disturbing any other parts. Furthermore, the alinement of parts will be preserved when they are again brought together after the clutch has for any reason, been removed. In the construction herein described, the movable clutch member is normally moved by the spring, in engaging, away from the fly wheel, and when the bolts $c$ are removed, the pin $m$ will move to the end of the slots $o$. At this point, the spring is held against further expansion and, upon removing the bolts $j$ and $q$ the intermediate shaft, together with the spring, the driving pin $m$ and the clutch ring $b$ can be removed in their entirety, and then the ring $b$ can be separated from the other parts. A further feature of advantage resides in the provision of the oiling devices herein described, whereby the thrust bearing at the end of the driving shaft is efficiently lubricated and prevented from becoming overheated when the clutch is running loose, or partially engaged, as when starting a vehicle.

Having thus described our invention, we declare that what we claim as new and desire to secure by Letters Patent, is,—

1. In an automobile, the combination of a driving gear and a shaft comprised in part by a clutch member, a sleeve supporting said clutch member, a hollow shaft on which said sleeve is adapted to slide longitudinally, a spring device contained within the said hollow shaft for moving the clutch member in one direction, the said hollow shaft being connected at each end to other sections of shafting and in alinement therewith, the said hollow shaft and its supported parts being removably secured by such connections in such manner that the said hollow shaft and its supported parts may be uncoupled and removed from the machine without disturbing the alinement of the remaining portions of the shaft.

2. In an automobile, the combination of two sections of alined shafting with the following instrumentalities intervening between the same, namely, a clutch member, a sleeve upon which said clutch member is carried, a hollow shaft surrounded by said sleeve, a spring device contained within the hollow shaft, means connecting the said sleeve with said spring device whereby the sleeve is forced longitudinally in one direction, said instrumentalities as an organism being removably connected to the said sections of the alined shafting and alined therewith and the said removable connections permitting the said clutch mechanism to be removed from the machine without disturbing the relation or alinement of the sections of shafting.

3. The combination of two sections of alined shafting, a removable section intervening between the two sections, a sleeve moving upon the said removable section and carrying the clutch member, and means for lubricating the section of shaft carrying the clutch member comprising a conduit contained within the said shaft, and a lubricant conducting pin passing into the said shaft, substantially as described.

4. The combination with two separated shafts, of an intermediate shaft coupled to one of said shafts and having movable devices for clutching the other shaft, said latter shaft having coöperating clutching devices separably secured thereto, whereby to permit removal of said clutch mechanism from between said shafts without disturbing their position, substantially as described.

5. The combination of two separated shafts, of an intermediate shaft coupled to one of said shafts and having movable devices for clutching the other shaft, said latter shaft having a flywheel carrying coöperating clutching devices separably secured thereto, whereby to permit removal of said clutch mechanism from between said shafts without disturbing their position, substantially as described.

6. The combination with two separated shafts, of an intermediate shaft separably coupled to one of said shafts and having a movable clutch ring for clutching the other shaft, a detachable clutch ring surrounding and coöperating with said movable clutch ring, said rings being one within the other in operative position, whereby, upon detaching the clutch ring from one shaft, and the intermediate shaft from the other, the clutch mechanism can be removed without disturbing said shafts, substantially as described.

7. The combination with a driving and a driven shaft, of an intermediate shaft separably coupled to the driven shaft and having a bearing in the driving shaft separable therefrom, and clutch devices carried by said intermediate shaft for clutching said driving shaft, said clutch devices being mounted so as to permit removal without disturbing the driving and driven shafts, substantially as described.

8. The combination with a driving shaft and a driven shaft, of an intermediate shaft separably coupled to one of said shafts and having a bearing in the end of the other, said driving shaft carrying a clutch member, a movable clutch member on said intermediate shaft adapted to engage therewith, one of said clutch members and said bearing being detachable from the shaft to permit removal of said intermediate shaft and the clutch independently of said driving and driven shafts, substantially as described.

9. The combination with a driving and a driven shaft, of an intermediate shaft carrying a clutch member adapted to clutch one of said shafts to form a driving connection, said intermediate shaft having a bearing carried by one of said shafts, and means for oiling said bearing through said intermediate shaft, substantially as described.

10. The combination with a driving and a driven shaft, of a separable intermediate shaft carrying a clutch member adapted to clutch one of said shafts to form a driving connection, said intermediate shaft having a separable end bearing carried by one of said shafts, and means for oiling said bearing through said intermediate shaft, substantially as described.

11. The combination with a flywheel carrying a separable clutch member, of an intermediate shaft carrying a movable coöperating clutch member, a shaft to which said intermediate member is coupled, said clutch member moving towards the fly wheel to release the driving connection, and a spring carried within the intermediate shaft for engaging said clutch members, substantially as described.

12. The combination with a shaft carrying a clutch member, of an intermediate shaft carrying a movable clutch member mounted on a sleeve, a driving connection permitting longitudinal movement between said sleeve and said shaft, a shaft coupled to said intermediate shaft, and means whereby the intermediate shaft with the clutch members, can be removed from between said shafts without involving disarrangement thereof, substantially as described.

13. In a flywheel clutch mechanism, a detachable clutch member secured to the flywheel outside the plane thereof, and a coöperating movable clutch member on a second detachable shaft carried within said clutch member and the flywheel, substantially as described.

14. In a clutch mechanism, a hollow slotted shaft, a clutch sleeve mounted on said shaft and having a driving pin passing through the shaft, a spring within said shaft and bearing at opposite ends against the shaft and said pin, and a second shaft having a clutch member adapted to be engaged with said first clutch, substantially as described.

15. In a clutch mechanism, a hollow slotted shaft, a clutch carrying sleeve mounted on said shaft and having a driving pin passing through said shaft, a spring controlling the sleeve and bearing at opposite ends against the shaft and said pin, a second shaft having a clutch member adapted to be engaged with said first clutch, a bearing for said first shaft in said second shaft, and means for oiling said bearing through said hollow shaft, substantially as described.

CARLTON R. MABLEY.
GUSTAVE E. FRANQUIST.

Witnesses:
LEWIS R. MACNAMARA,
A. E. OSBORNE.